(12) United States Patent
Klepacki et al.

(10) Patent No.: US 12,040,656 B2
(45) Date of Patent: Jul. 16, 2024

(54) ENGINEERED POWER ON DEMAND

(71) Applicant: WESTGEN TECHNOLOGIES INC., Calgary (CA)

(72) Inventors: Benjamin David Klepacki, Calgary (CA); Craig Antony Howard, Carstairs (CA); Connor Stanford O'Shea, Calgary (CA)

(*) Notice: Subject to any disclaimer, the term of this patent is extended or adjusted under 35 U.S.C. 154(b) by 0 days.

(21) Appl. No.: 16/758,838

(22) PCT Filed: Mar. 31, 2020

(86) PCT No.: PCT/CA2020/050420
§ 371 (c)(1),
(2) Date: Apr. 23, 2020

(87) PCT Pub. No.: WO2021/113953
PCT Pub. Date: Jun. 17, 2021

(65) Prior Publication Data
US 2022/0376546 A1    Nov. 24, 2022

Related U.S. Application Data

(60) Provisional application No. 62/945,694, filed on Dec. 9, 2019.

(51) Int. Cl.
*H02J 9/06* (2006.01)
*F01M 9/00* (2006.01)
(Continued)

(52) U.S. Cl.
CPC ............... *H02J 9/061* (2013.01); *F01M 9/00* (2013.01); *F02B 63/048* (2013.01);
(Continued)

(58) Field of Classification Search
CPC ........ H02J 9/061; H02J 3/381; H02J 2300/10; H02J 2300/24; H02J 7/35; H02J 9/06;
(Continued)

(56) References Cited

U.S. PATENT DOCUMENTS 8,467,907 B2   6/2013 Hagler
9,048,780 B2   6/2015 Caster et al.
(Continued)

FOREIGN PATENT DOCUMENTS

AU   2015101163 A4   10/2015
CA      3099596 A1   11/2019
(Continued)

OTHER PUBLICATIONS

Extended European Search Report of the European Patent Office, <May 17, 2023.

*Primary Examiner* — Elim Ortiz
(74) *Attorney, Agent, or Firm* — Bennett Jones LLP

(57) ABSTRACT

A system, module, and method for generating reliable, high quality power on demand and off-grid includes a photovoltaic array for delivering DC power; a generator having a size ranging from about 5 kW to about 30 kW, and comprising an engine powered by hydrocarbon gas filtered through a coalescing filter and comprising an extended lubrication system; an uninterruptible power supply (UPS) comprising a storage battery, the UPS being coupled to the photovoltaic array for receiving the DC power, and to the generator by a bi-directional inverter for receiving, transmitting, and qualifying DC or AC power; and an intelligent controller coupled to the UPS for controlling output of the DC or AC power to at least one air compressor capable of providing compressed air to one or more pneumatic devices.

10 Claims, 9 Drawing Sheets

(51) Int. Cl.
  *F02B 63/04* (2006.01)
  *F02M 21/02* (2006.01)
  *F02M 25/00* (2006.01)
  *H02J 3/38* (2006.01)

(52) U.S. Cl.
  CPC ........ *F02M 21/0227* (2013.01); *F02M 25/00* (2013.01); *H02J 3/381* (2013.01); *H02J 2300/10* (2020.01); *H02J 2300/24* (2020.01)

(58) Field of Classification Search
  CPC ....... F01M 9/00; F02B 63/048; F02B 63/044; F02M 21/0227; F02M 25/00; E21B 41/00
  See application file for complete search history.

(56) References Cited

U.S. PATENT DOCUMENTS

| | | | |
|---|---|---|---|
| 9,140,110 | B2 | 9/2015 | Coli et al. |
| 9,617,990 | B2 | 4/2017 | Graybill |
| 2002/0136939 | A1* | 9/2002 | Grieve ................ H01M 8/0488 429/432 |
| 2008/0149186 | A1 | 6/2008 | Martin |
| 2008/0278003 | A1 | 11/2008 | Pouchet et al. |
| 2008/0283247 | A1 | 11/2008 | Zubrin et al. |
| 2010/0217443 | A1 | 8/2010 | Hagler |
| 2014/0116870 | A1* | 5/2014 | Kamen ..................... E04H 3/08 202/83 |
| 2016/0190867 | A1 | 6/2016 | Ginart et al. |
| 2018/0003122 | A1 | 1/2018 | Burkell et al. |
| 2018/0283776 | A1 | 10/2018 | Mackillop |
| 2019/0237995 | A1 | 8/2019 | Akita et al. |

FOREIGN PATENT DOCUMENTS

| | | |
|---|---|---|
| CN | 101286655 A | 10/2008 |
| CN | 101309017 A | 11/2008 |
| CN | 105356573 A | 2/2016 |
| GB | 2516414 A | 1/2015 |
| JP | 2001304001 A * | 10/2001 |
| JP | 2001304001 A | 10/2001 |
| WO | 2015138308 A2 | 9/2015 |
| WO | 20150138308 A2 | 9/2015 |
| WO | 2016083899 A1 | 6/2016 |
| WO | 2019107802 A | 6/2019 |

* cited by examiner

LOGGING

| | | | |
|---|---|---|---|
| RESET | INTERIOR LIGHTS OFF | SECURITY OFF | 12.1 C BUILDING TEMP | 12.1 C BUILDING TEMP SET |

FT-1000

| ON | OFF | RESET LOGGING | FT-1000 TOTAL SCF | |
|---|---|---|---|---|
| | | | 1234 SCF | |

K-1000A

| RESET TOTAL HRS | RESET MAINTENANCE HRS | TOTAL HRS | TOTAL MAINTENANCE HRS | TOTAL MAINTENANCE HRS SET |
|---|---|---|---|---|
| | | 123.12 HRS | 123456 HRS | 123456 HRS |

K-1000B

| RESET TOTAL HRS | RESET MAINTENANCE HRS | TOTAL HRS | TOTAL MAINTENANCE HRS | TOTAL MAINTENANCE HRS SET |
|---|---|---|---|---|
| | | 123456 HRS | 123456 HRS | 123456 HRS |

G-1000

| RESET TOTAL HRS | RESET MAINTENANCE HRS | TOTAL HRS | TOTAL MAINTENANCE HRS | TOTAL MAINTENANCE HRS SET |
|---|---|---|---|---|
| | | 123456 HRS | 123456 HRS | 123456 HRS |

| MAIN PAGE | PROCESS PAGE 1 | PROCESS PAGE 2 | LOGGING | ALARMS |

24:00:00 yy/mm/dd
GCI Global Controls Incorporated

ENGINEERED POWER ON DEMAND

CROSS REFERENCE TO RELATED APPLICATION

This application claims priority of United States Provisional Patent Application Ser. No. 62/945,694, entitled "Engineered Power On Demand (EPOD)", filed Dec. 9, 2019, and hereby incorporated by reference herein in its entirety (where permitted).

TECHNICAL FIELD

The present invention relates to a system, module, and method for providing power generation and compressed air using natural gas and renewable energy for off-grid locations.

BACKGROUND OF THE INVENTION

Remote wellsites often rely on fuel gas driven pneumatic systems which use the mechanical energy stored in high pressure gas from a well or fuel gas source to actuate valves in the open and closed positions to control well flow and to power injection pumps. Once spent, the gas is vented to the atmosphere. However, the gas is composed predominantly of methane, thus creating a safety hazard (i.e., explosion risks) and negatively impacting the environment. Further, wet gas may flood instruments.

Methane has a greenhouse gas intensity twenty-five times greater than that of carbon dioxide. In Canada, 44% of methane emissions are from oil and gas. Venting gas through pneumatic devices makes up about 35% of the oil and gas industry's total methane venting in Canada, which equates to about 18,000,000 tonnes of carbon dioxide annually. Goals have thus been set to reduce carbon emissions by 45%. New regulations aim to restrict the use of fuel gas pneumatic controllers, and existing high bleed pneumatic controllers (which emit 67 tonnes CO2e annually) will need to be retrofitted or converted to instrument air pneumatic systems.

Commercially available power generation systems to generate less than 5 kW of power for off-grid wellsites include, but are not limited to, solar, thermoelectric generators, and fuel cells. For larger power demands, natural gas generators and microturbines are readily available to generate greater than 30 kW. However, there has been a gap in cost-effective remote power generation technology that has made it difficult to supply power in the 5 kW to 30 kW range required to run an adequately sized power generation system for use at remote wellsites.

SUMMARY OF THE INVENTION

The present invention relates to a system, module, and method for providing power generation and compressed instrument air using hydrocarbon gas and renewable energy for off-grid locations. It was surprisingly discovered that by utilizing the system, module, and method of the present invention, one or more of the following benefits may be realized:

(1) The invention relates generally to a hybrid system powered by a renewable energy source in conjunction with DC and AC power distribution which enables a load to be powered from a battery, and a generator to be run intermittently on hydrocarbon gas to supply back-up power.

(2) The invention also provides an extended lubrication system to increase the service interval of the generator engine and to handle combustion byproducts. The extended lubrication system may comprise a filtration system which continuously slipstreams a portion of oil through a separate filter. The oil capacity is significantly increased to allow for dilution of any combustion byproducts from variable quality fuels. The invention also provides an electrical design providing battery back-up and electrical power conditioning to enable use of variable quality fuel sources.

(3) The invention may supply power in the 5 kW to 30 kW range required to run an adequately sized instrument air system.

(4) The invention may be suitable for any off-grid remote location. In an exemplary use, the invention may be suitable for a wellsite in providing a remote power generation and air compression system capable of providing sufficient power and instrument air to eliminate fuel gas pneumatics and methane venting on a wellsite. The invention may be capable of burning hydrocarbon gas (for example, hydrocarbon gas directly from the wellhead), and generating power (in combination with solar energy) and instrument air to power the wellsite.

(5) The invention takes operators into consideration by providing proper heating, ventilation, air conditioning, and safety measures within the operators' work module; extended service intervals; remote monitoring capabilities; and air metering.

Thus, broadly stated, in one aspect of the invention, a system for generating power on demand and off-grid is provided, comprising: a power source using a renewable resource; an uninterruptible power supply (UPS) comprising a storage battery and coupled to the power source for receiving DC or AC power; and an intelligent controller coupled to the UPS for controlling output of the DC or AC power to one or more devices.

In the various embodiments, the power source for delivering the DC power may be a photovoltaic array. In the various embodiments, the system may further comprise a battery charge controller coupled to the power source for regulating the DC power.

In the various embodiments, the power source for delivering the AC power may be selected from a generator or a utility power connection. In the various embodiments, the power source may comprise a generator having a size ranging from about 5 kW to about 30 kW, and comprising an engine powered by hydrocarbon gas. In the various embodiments, the hydrocarbon gas is filtered through a coalescing filter to remove free liquid.

In the various embodiments, the engine comprises an extended lubrication system for slipstreaming a portion of oil through a filter to extend service intervals, and diluting combustion byproducts.

In the various embodiments, the storage battery may be coupled to the generator by a bi-directional power inverter, the bi-directional power inverter being configured, in a first mode of operation, to receive and convert the DC power into AC power, and in a second mode of operation, to receive and convert AC power into DC power for charging the storage battery.

In the various embodiments, the bi-directional power inverter qualifies the DC or AC power and switches loads within a set timeframe to ensure uninterrupted transition from the storage battery to the generator.

In the various embodiments, the bi-directional power inverter may comprise an AC transfer switch for providing the AC power from one or more AC power sources.

In the various embodiments, the system may further comprise one or more of a DC power distribution unit and an AC power distribution unit for supplying power to one or more devices. In the various embodiments, the one or more devices may comprise at least one air compressor capable of providing compressed air to one or more pneumatic devices.

In another aspect of the invention, a system for generating power on demand and off-grid comprises a photovoltaic array for delivering DC power; a generator having a size ranging from about 5 kW to about 30 kW, and comprising an engine powered by hydrocarbon gas filtered through a coalescing filter and comprising an extended lubrication system for slipstreaming a portion of oil through a filter to extend service intervals, and diluting combustion byproducts; an uninterruptible power supply (UPS) comprising a storage battery, the UPS being coupled to the photovoltaic array for receiving the DC power, and to the generator by a bi-directional inverter for receiving DC or AC power; and an intelligent controller coupled to the UPS for controlling output of the DC or AC power to at least one air compressor capable of providing compressed air to one or more pneumatic devices.

In another aspect of the invention, a system for generating power on demand and off-grid comprises a photovoltaic array for delivering DC power; a generator having a size ranging from about 5 kW to about 30 kW, and comprising an engine powered by hydrocarbon gas filtered through a coalescing filter and comprising an extended lubrication system for slipstreaming a portion of oil through a filter to extend service intervals, and diluting combustion byproducts; an uninterruptible power supply (UPS) comprising a storage battery, the UPS being coupled to the photovoltaic array for receiving the DC power, and to the generator by a bi-directional inverter for receiving DC or AC power; and an intelligent controller coupled to the UPS for controlling output of the DC or AC power to one or more devices.

In another aspect of the invention, a system for generating power on demand and off-grid comprises a generator having a size ranging from about 5 kW to about 30 kW, and comprising an engine powered by hydrocarbon gas filtered through a coalescing filter and comprising an extended lubrication system for slipstreaming a portion of oil through a filter to extend service intervals, and diluting combustion byproducts; a power storage device coupled to the generator by a bi-directional power inverter for receiving DC or AC power; and an intelligent controller coupled to the storage battery for controlling output of the DC or AC power to one or more devices.

In another aspect of the invention, a system for generating power on demand and off-grid comprises an on-site power source for powering an air compressor capable of providing compressed air to one or more pneumatic devices; and an intelligent controller for collecting data in relation to carbon credit generation.

In another aspect of the invention, a module formed of a modified shipping container and comprising any of the above systems is provided.

In the various embodiments, the module further comprises one or more of a motion sensor, lighting system, smoke detector, space heater using renewable energy, and heating, ventilation, and air conditioning system.

In another aspect of the invention, a method for generating power on demand and off-grid using the above system comprises: converting sunlight rays into DC power using a photovoltaic array; supplying hydrocarbon gas to operate an engine of a generator to generate AC power; conditioning the DC or AC power using a bi-directional inverter to output conditioned DC or AC power; delivering the conditioned DC or AC power to a UPS comprising a storage battery; and controlling output of the DC or AC power to operate at least one air compressor for providing compressed air to one or more pneumatic devices.

In the various embodiments, the hydrocarbon gas is filtered through a coalescing filter. In the various embodiments, the engine comprises an extended lubrication system for slipstreaming a portion of oil through a filter to extend service intervals, and diluting combustion byproducts. In the various embodiments, conditioning the DC or AC power comprises converting the DC power to AC power, or the AC power to DC power.

In another aspect of the invention, a method for generating power on demand and off-grid using the above system comprises: converting sunlight rays into DC power using a photovoltaic array; supplying hydrocarbon gas recovered from a wellhead to operate an engine of a generator to generate AC power; conditioning the DC or AC power using a bi-directional inverter to output conditioned DC or AC power; delivering the conditioned DC or AC power to a UPS comprising a storage battery; and controlling output of the DC or AC power to operate one or more devices.

In another aspect of the invention, a method for generating power on demand and off-grid using the above system comprises: supplying hydrocarbon gas recovered from a wellhead to operate an engine of a generator to generate AC power; conditioning the DC or AC power using a bi-directional inverter to output conditioned DC or AC power; delivering the conditioned DC or AC power to a power storage device; and controlling output of the DC or AC power to operate one or more devices.

In another aspect of the invention, a method for generating power on demand and off-grid using the above system comprises supplying power from an on-site power source to an air compressor capable of providing compressed air to one or more pneumatic devices; and collecting data in relation to carbon credit generation.

Additional aspects and advantages of the present invention will be apparent in view of the description, which follows. It should be understood, however, that the detailed description and the specific examples, while indicating preferred embodiments of the invention, are given by way of illustration only, since various changes and modifications within the scope of the invention will become apparent to those skilled in the art from this detailed description.

BRIEF DESCRIPTION OF DRAWINGS

Embodiments of the invention will now be described with reference to the accompanying drawings, in which:

FIG. 3A is a schematic plan view of the interior of the self-contained module. FIG. 3B is a schematic front view of the self-contained module of FIG. 3A. FIG. 3C is a schematic rear view of the self-contained module of FIG. 3C.

FIGS. 4A-E show embodiments of a user interface whereby a user can operate the system of FIG. 1.

DETAILED DESCRIPTION

Unless defined otherwise in this specification, all technical and scientific terms are used herein according to their conventional definitions as they are commonly used and understood by those of ordinary skill in the art of engineering.

As used herein, the terms "comprises" or "comprising" should be interpreted as referring to elements, components, or steps in a non-exclusive manner, indicating that the referenced elements, components, or steps may be present, or utilized, or combined with other elements, components, or steps that are not expressly referenced.

As used herein and in the appended claims, the singular forms "a", "an," and "the" include plural referents unless the context clearly dictates otherwise.

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present invention comprises a system, module, and method for providing power generation and compressed air using hydrocarbon gas and renewable energy for off-grid remote locations. As used herein, the term "off-grid" refers to locations which are not connected to one or more public utilities including, but not limited to, electricity, gas, and water. As used herein, the term "remote" refers to an area which is a distance away from a city, town, or other residential area. In the various embodiments, the off-grid remote location may be a wellsite.

Figure 1:
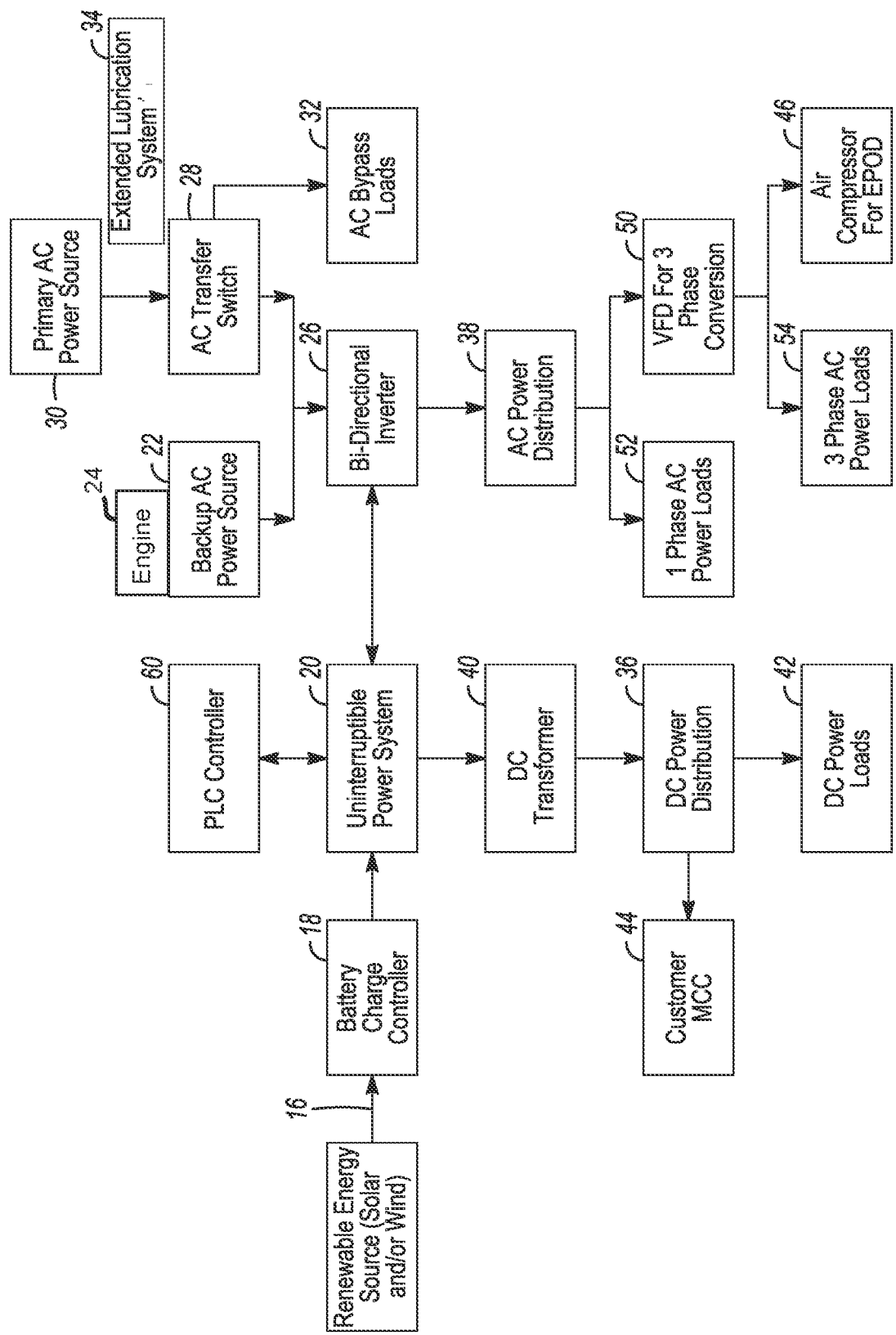
FIG. 1 is a block diagram of a system form of the invention.

Referring to FIG. 1, the system form (1) of the invention may include various components which intercommunicate to perform selected functions. Referring to FIGS. 2A-2C and 3A-3C, the components of the system form (1) of the invention may be integrated as an entirely self-contained module (2). Referring to FIGS. 4A-E, embodiments of a user interface whereby a user may operate the system (1) integrated within the module (2) are shown.

In general, the system form (1) of the invention comprises a combination of the following features: (a) a hybrid system powered by a renewable energy source (for example, solar power) in conjunction with DC and AC power distribution which enables a load to be powered from a battery, and a generator to be run intermittently on hydrocarbon gas (for example, natural gas on a wellsite) to supply back-up power and extend service intervals; (b) an extended lubrication system to increase the service interval of the generator engine, and to dilute combustion byproducts from variable quality fuels; and (c) an electrical design providing battery back-up and electrical power conditioning to enable use of variable quality fuel sources, as further described herein.

Power Generation

In the various embodiments, power may be generated using a renewable energy source including, but not limited to, sunlight, wind, or both. In the various embodiments, power may be generated using a solar photovoltaic array (10) or a wind-powered electricity generation unit. In the various embodiments, power may be generated using a solar photovoltaic array (10) comprising a linked collection of photovoltaic modules (12) (colloquially termed "solar panels"), each photovoltaic module (12) being formed of multiple interconnected photovoltaic cells (14). The photovoltaic cells (14) convert sunlight or solar energy into direct current ("DC") electricity (16). The DC electricity (16) generated by the solar photovoltaic array (10) may be delivered continuously through a battery charge controller (18) to one or more batteries (20).

In the various embodiments, the battery charge controller (18) may regulate the voltage, current, or both being delivered to the battery (20) of an uninterruptible power supply ("UPS"). By continuously monitoring the charge state of the battery (20), the battery charge controller (18) prevents overcharge or damage to the battery (20). If the charge state of the battery (20) drops below a predetermined state, the system (1) includes a backup alternating current ("AC") source including, but not limited to, a generator or utility power connection. In the various embodiments, a generator (22) may serve as a backup electrical power source which converts mechanical energy into electrical energy. The generator (22) is powered by an internal combustion engine (24) and is activated upon receipt of a transmitted start signal. In the various embodiments, the size of the generator (22) may range from about 5 kW to about 30 kW. In the various embodiments, the size of the generator (22) may be selected from about 6 kW, 20 kW, or 30 kW.

In the various embodiments, a power storage device (instead of a UPS) may be utilized including, but not limited to, a battery or an ultracapacitor.

Once running, the generator (22) may be programmed to operate at the desired constant revolutions per minute ("RPM"). As load increases, fuel is added (and consequently more air) to maintain the RPM. A suitable fuel may be a hydrocarbon gas. As used herein, the term "hydrocarbon gas" refers to any gas comprising molecules of carbon and hydrogen in various combinations. The term refers to untreated and treated hydrocarbon gas including, but not limited to, natural gas propane, and the like. In the various embodiments, the hydrocarbon gas may be natural gas from the well, pipeline, or other source. In the various embodiments, the hydrocarbon gas may be natural gas sourced from the well at the off-grid remote location.

This allows the engine (24) to operate with variable heating value fuels as fuel flow for higher calorific value fuels is just reduced to maintain the constant RPM. In the event of a sudden change in calorific value and an RPM surge, a power inverter (26) detects a frequency or voltage change and disqualifies the load, protecting any electronics.

In the various embodiments, the fuel gas pressure regulator may ensure that the fuel gas pressure is maintained below about 50 psig in compliance with electrical area classification. In the various embodiments, the hydrocarbon gas is routed through a coalescing filter to remove any free liquids. In the various embodiments, a differential pressure switch may be positioned proximate to the coalescing filter to measure pressure drop and to emit an alert if the coalescing filter requires replacement.

In the various embodiments, the power inverter (26) may be connected to the generator (22) and the battery (20). In the various embodiments, the power inverter (26) may be a bi-directional power inverter. In the various embodiments, the bi-directional power inverter (26) may convert DC produced by the battery (20) to alternating current ("AC"), and controls the voltage and frequency of its output. In the various embodiments, the bi-directional power inverter (26) may be utilized to rectify AC to DC in order to charge the battery (20). In the various embodiments, the power inverter (26) may comprise an internal charge controller which continuously monitors the charge state of the battery (20) to prevent overcharging. Both functions may occur simultaneously.

In the various embodiments, the power inverter (26) may include an automatic AC transfer switch (28) that switches to whichever AC is providing power—either a primary AC source (30) or the backup AC power source such as the generator (22). The AC transfer switch (28) does not allow two AC sources (22, 30) to provide power simultaneously. In the various embodiments, the AC transfer switch (28) directs AC to AC bypass loads (32).

The power inverter (26) reviews any loads on the battery (20) and qualifies the voltage and frequency of the generator (22) to ensure that they match. Once the supply and load of the generator (22) have been qualified, the power inverter (26) utilizes the supply of the generator (22) to power the load. The power inverter (26) is programmed with the maximum amperage of the generator (22) and utilizes the difference in current between the load and the maximum ampacity of the generator (22) to charge the battery (20). Once the battery (20) has been fully charged, the generator (22) is turned off and the load switches to run off the battery (20) through the power inverter (26). The power inverter (26) can qualify and switch loads within one half cycle to ensure a smooth and uninterrupted transition from the battery (20) to the generator (22). In the various embodiments, multiple power inverters (26) may be added in parallel to increase the capacity of the system (1).

The generator (22) has a required cool down time and a shutdown signal is sent to the generator (22) prior to the battery (20) reaching full charge. This allows the generator (22) to cool down under a partial state of load to "top off" the battery (20) during the cool down cycle and avoid wasted engine run time and fuel.

Extended Lubrication System

Typical engine oil maintenance cycles generate operating issues for remote locations. Further, byproducts from the combustion of "dirty" natural gas (for example, well gas including hydrocarbons heavier than methane and additional organic compounds) can foul the lubricating oil of the engine (24) from engine blow by. In the various embodiments, the engine (24) may be provided with an extended lubrication system (34) for increasing the maintenance life of the engine (24) and handling combustion byproducts from the well.

In the various embodiments, the extended lubrication system (34) may comprise a filtration system which continuously slipstreams a portion of oil through a separate filter. The oil capacity is significantly increased to allow for dilution of any combustion byproducts. Oil from the pressure side of the oil pump is diverted through an orifice meter to a secondary filtration system and routed back to the crankcase where oil is typically stored within an oil pump.

In the various embodiments, a continuous feed system may be provided to increase further the maintenance life of the engine (24). In such a system, oil is continuously drained off the crankcase through an orifice plate to a spent oil tank. The oil level is monitored when the oil in the crankcase hits a specified level, a solenoid opens, and gravity drains fresh oil to the crank until level is satisfied again.

Air Compression

In the various embodiments, the system (1) may include a DC power distribution system (36), an AC power distribution system (38), or both, thereby providing a centralized power supply for off-grid remote locations. The DC power distribution system (36) receives DC from the battery (20) through a DC transformer (40) and distributes power to DC control systems and DC power loads (42) including, but not limited to, chemical pumps, a motor control system (44), and the like.

In the various embodiments, the system (1) may power one or more air compressors (46). As used herein, the term "air compressor" refers to a device which converts power (using a motor or engine) into potential energy stored in pressurized air (i.e., compressed air) which is supplied to various equipment. In the various embodiments, the air compressor (46) may comprise a 3 HP to 20 HP duplex reciprocating air compressor or scroll air compressor. In the various embodiments, the air compressor (46) may comprise a 3, 5, or 7.5 HP duplex reciprocating air compressor or scroll air compressor. In the various embodiments, the air compressor (46) may include a fire eye (48) for fire safety protection.

In the various embodiments, the air compressor (46) may be used to provide compressed air to one or more pneumatic devices. As used herein, the term "pneumatic device" means any instrument which generates and utilizes compressed air. Non-limiting examples of pneumatic devices include valve actuation devices, process control and sensing devices, pumps, water transfer pumps, small pump jacks, and block valves.

In the various embodiments, the air compressor (46) may be powered by a variable frequency drive (VFD) (50). The VFD (50) controls AC motor speed and torque by varying motor input frequency and voltage. In the various embodiments, the VFD (30) may transform single phase power (52) from the power inverter (26) to three phase power (54) for the air compressor (46). In addition, the VFD (50) controls starting current. In the various embodiments, the VFD (50) may convert a single phase 230 VAC source into a 230 VAC three phase source to power the air compressor (46).

In the various embodiments, a pair of air compressors (46) may be provided. The air compressors (46) operate in a lead/lag fashion to maximize the run time of each air compressor (46), thereby maximizing time between maintenance. Under normal operation, only one air compressor (46) operates at a time by alternating the air compressors (46) at each start event, thereby allowing each air compressor (46) to cool off fully between operation and extending compressor life. In the various embodiments, the air compressors (46) may be powered by individual VFD's or a single VFD with a relay that switches between the air compressors (46). In addition to phase conversion, the VFD (50) allows current inrush of the motor to be controlled to ensure any current limits on the power inverter (26) are not exceeded.

Compressed air from the air compressor (46) flows to a wet air receiver. As used herein, the term "wet air receiver" refers to a storage vessel or tank positioned after the air compressor (28). The wet air receiver provides additional storage capacity and reduces moisture by collecting liquid. The compressed air passes through a first filter before entering a regenerative desiccant dryer system (56) to remove water. Dried air then passes through a second filter to removes any remaining particulates or oil. The cleaned dried air then flows through a mass flow meter (58) which continuously monitors air usage. The air compressor (46) may thus provide sufficient compressed air to allow one or more pneumatic devices to operate on compressed air rather than methane, thereby eliminating methane venting on off-grid remote locations such as, for example, wellsites. In various embodiments, the air usage is recorded and trended by a programmable logic controller ("PLC") (60). This may allow for accurate monitoring of the air used; generating carbon credits; and setting high or low flow alarms.

A pressure transmitter (62) connected to the wet air receiver controls the operation of the air compressor (46). When the pressure transmitter (62) falls below a setpoint, the air compressor (46) is activated by a start command. Once the setpoint is reached, the air compressor (46) is deactivated by a stop command. The run time of the air compressor (46) is monitored by the PLC (60) to alert the operator when scheduled maintenance is required. If an air compressor (46) fails to run following a start command, it is placed in fault mode and removed from operation. A fault call out is logged in a programmable logic controller ("PLC") (60) and the operator is alerted.

Programmable Logic Controller

In the various embodiments, a PLC (60) may control the functions of the system (1), performs datalogging, and communicates with any site master controller. The PLC (60) may allow monitoring and trending of system process conditions including, but not limited to, run status of the generator (22), run time, voltage and current, charge and voltage state of the battery (20), input from the photovoltaic modules (12), temperature, run time of the air compressor (46), and volume of air used. The PLC (60) may be integrated into a Supervisory Control and Data Acquisition ("SCADA") system which allows for remote operation and monitoring of the system (1); emits alerts in the event of a fault; and enables generation of carbon credits through reporting of required data in compliance with government regulations.

Integration of System in a Module

Referring to FIGS. 2A-2C and 3A-C, the components of the system form (1) of the invention may be integrated within an entirely self-contained module (2) in order to provide uninterruptible power generation and air compression at off-grid remote locations. In the various embodiments, the module (2) may be pre-constructed, tested, and commissioned at a manufacturer or machine shop before being shipped to the desired off-grid remote location. In this manner, components do not have to be purchased from separate vendors, hastily engineered into the required configuration, and fabricated on site. Rather, the fully fabricated module (2) may be purchased by a sole vendor and shipped to the location in one easily transportable unit. Once at the location, installation requires only connecting the fuel gas inlet, compressed air outlet, and wiring other wellsite components to the DC and AC power distribution systems (36, 38). This may save costs and reduce supply chain and operational problems.

In the various embodiments, the module (2) may be constructed from a conventional shipping container (for example, a Sea-Can™ Container as manufactured by Sea-Can Containers, Ltd., Alberta, Canada). In the various embodiments, the container may be modified by replacing wooden flooring with aluminum non-slip flooring, and installing insulated paneling (for example, galvalume) to the walls, doors, and ceiling. In the various embodiments, a wall of the container may be replaced by the insulated paneling and a man door (116). Installing the man door (116) within the insulated paneling (as opposed to cutting a man door through the original wall of the container) ensures a proper tight fit and avoids development of rust. In the various embodiments, a ladder (64) may be attached to an end wall (66) of the module (2) to provide access to the roof (68) of the module (2).

Figure 2A:
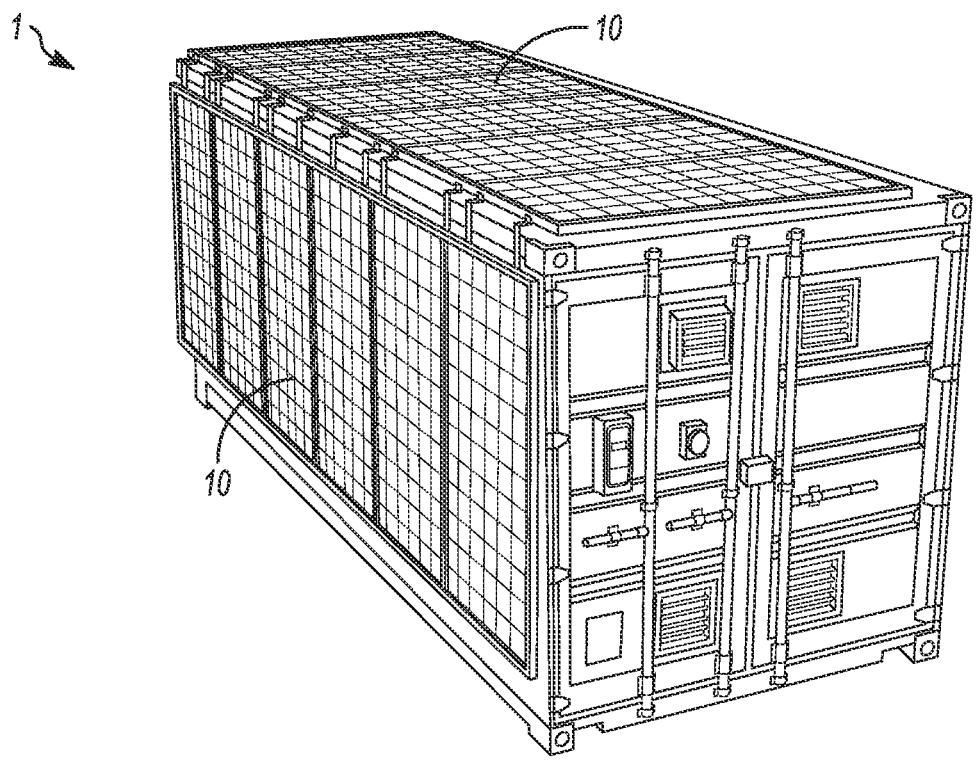
FIGS. 2A-B are perspective views of the system form of FIG. 1 integrated as a first embodiment of a self-contained module.
Figure 2B:
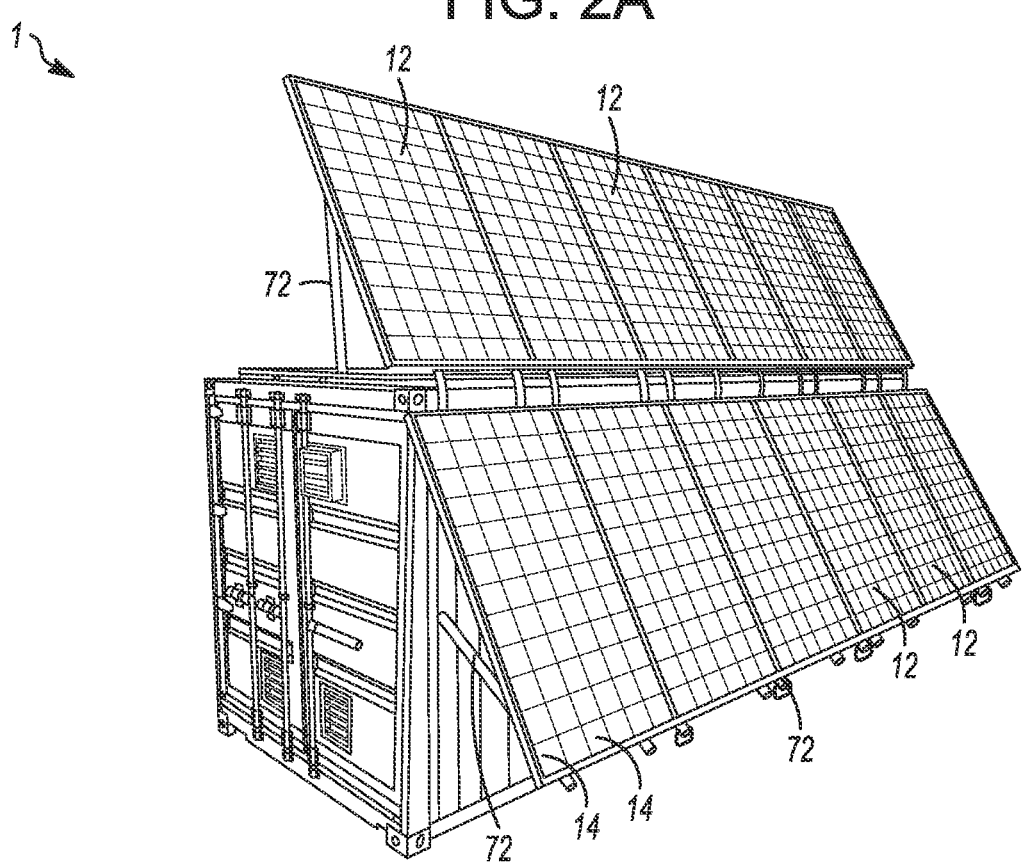
Figure 2C:
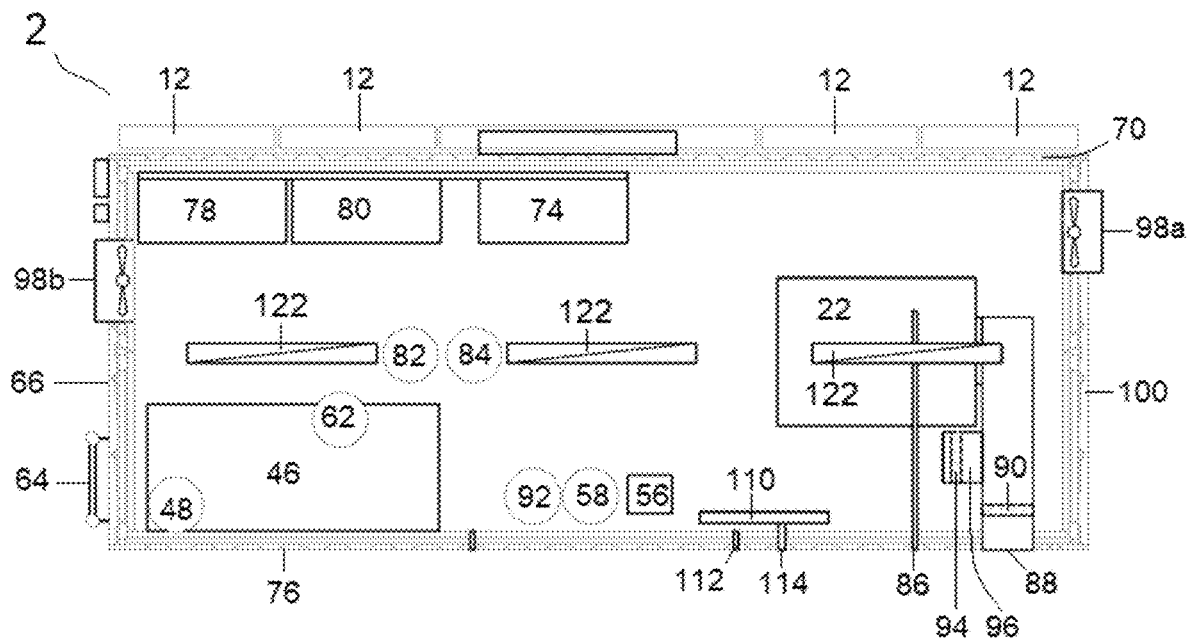
FIG. 2C is a schematic plan view of the interior of the self-contained module of FIGS. 2A-B.

In the various embodiments, one or more photovoltaic modules or solar panels (12) may be mounted to a side wall (70), roof (68), or both of the module (2) using suitable attachment means including, but not limited to, extendable telescoping struts (72). As shown in FIGS. 2A-B, the telescoping struts (72) are adjustable to enable the solar panels (12) to be positioned flush to the side wall (70) or roof (68) for shipping to the off-grid remote location, and outwardly to a desired angle once the module (2) has been deployed at the off-grid remote location. In the various embodiments, the telescoping struts (72) may define one or more apertures for receiving suitable locking means (for example, pins and the like) to lock the solar panels (12) in position at the desired angle relative to the side wall (70) or roof (68) of the module (1). The angle may be adjusted accordingly depending on the season and latitude in order to gather sufficient solar energy.

Figure 3A:
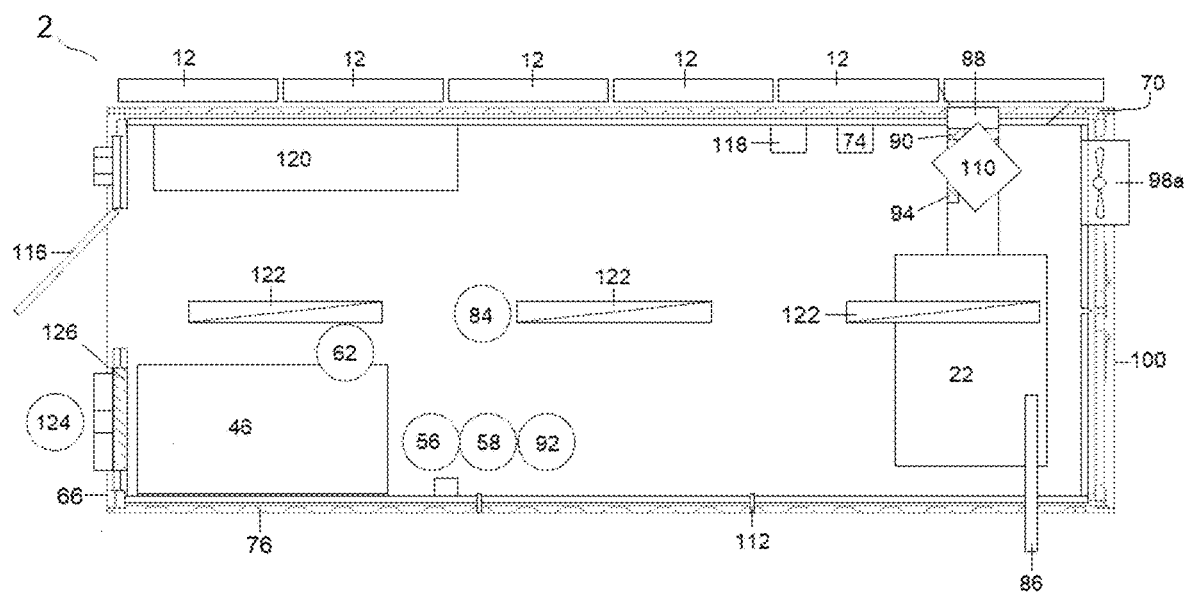
FIGS. 3A-C are schematic views of the system form of FIG. 1 integrated as a second embodiment of a self-contained module.

In the various embodiments, the module (2) may include a control system (74) comprising the PLC (30), a touchscreen human machine interface (HMI), and associated breakers (for example, a generator breaker (118) as shown in FIG. 3A) and contactors. Provision of the control system (74) conveniently removes the requirement for additional electrical buildings at the off-grid remote location. In the various embodiments, the generator (22) and engine (24) may be positioned beside a side wall (76) opposite the air compressor (46) to allow sufficient space for the control system (74), DC control panel (78), and AC control panel (80). In the various embodiments, the DC control panel (78) and AC control panel (80) may be provided in the form of a single control unit (120) as shown in FIG. 3A. The generator (22) and engine (24) are mounted on a skid for easy access and maintenance. In the various embodiments, the UPS including the battery (20) is contained within the control panels (78, 80) mounted to the side wall (70) of the module (2).

Figure 3B:
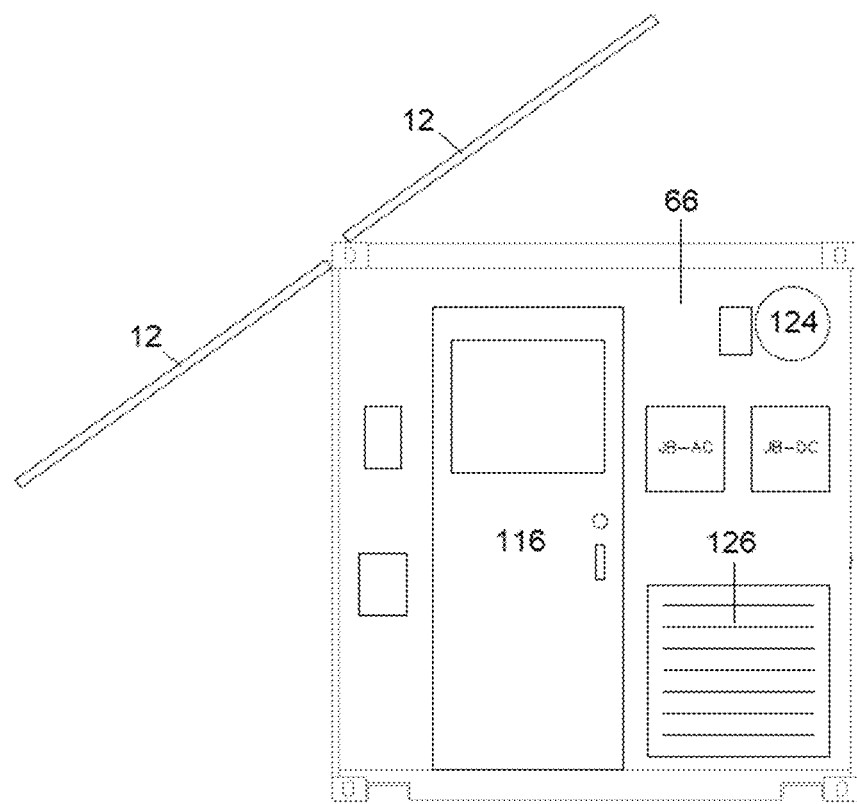
Figure 3C:
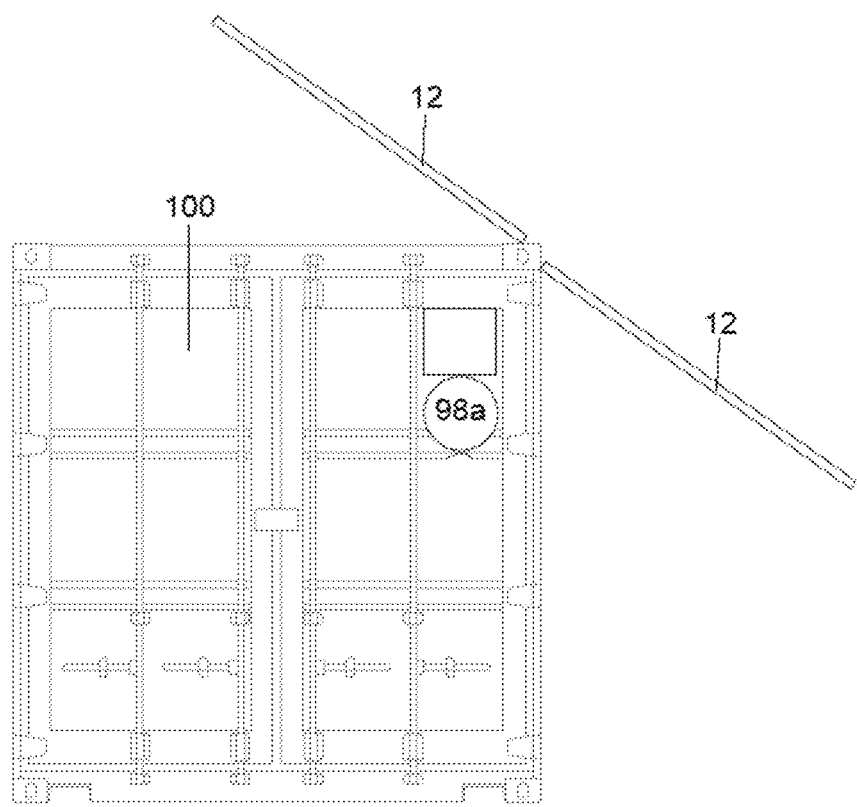

In the various embodiments, the module (2) may include a motion sensor (82) which is connected to the control system (74) for providing security and controlling a lighting system (122). In the various embodiments, the lighting system (122) may comprise light-emitting diodes (LEDs). If motion is detected within the module (2), the lighting system (122) turns on and a passcode must be entered within a preset timeframe via the HMI, or an alarm is triggered and an alert transmitted to the operator. After a set period of no motion, the motion sensor (82) automatically turns off the lights to avoid unnecessary power draw. In the various embodiments, an exterior lighting system (124) may be maintained during hours of low light, as set by a clock connected to the control system (74) (FIG. 3B). In the various embodiments, the exterior lighting system (124) may comprise LEDs. In the various embodiments, a smoke detector (84) may be provided to detect smoke and emit an alarm.

In the various embodiments, the module (2) may include a heating, ventilation, and air conditioning ("HVAC") system. In the various embodiments, exhaust from the generator (22) may exit the module (2) through a generator exhaust (86). In the various embodiments, hot air emitted from the radiator of the generator (22) may pass through an exhaust duct (88) including an exhaust louvre to exit the module (2). A modulating damper (90) is positioned upstream of the exhaust louvre, and is controlled by a temperature sensor (92) in the module (2). If the temperature falls below a setpoint, the modulating damper (90) closes, increasing static pressure in the exhaust duct (88) and causing a weighted backdraft damper (94) positioned upstream on a ducted "T" to recirculate hot air through a recirculation duct (96) back into the module (2) as the primary source of heating.

When the temperature rises above the setpoint, the modulating damper (90) opens fully, and one or more exhaust fans (98a, 98b) are activated at low speed. If the temperature continues to rise, or if an explosive environment is detected using a suitable sensor including, but not limited to, a lower explosive limit and gas sensor, the exhaust fans (98a, 98b) are activated at high speed. In the various embodiments, the exhaust fans (98a, 98b) may be positioned on opposite end walls (66, 100) of the module (2). At a setpoint, a high temperature alarm emits an alert to the operator.

If the modulating damper (90) is fully closed and the set temperature cannot be satisfied, a space heater (110) is activated. In the various embodiments, the space heater (110) may be connected to an inlet (112) for receiving fuel (for example, natural gas) from the exterior of the module (2) and to an exhaust outlet (114) extending to the exterior of the module (2). Suitable space heaters (110) include, but are not limited to, explosion-proof infrared gas catalytic heaters and the like (for example, a Cata-Dyne™ heater, Thermon Heating Systems).

In the various embodiments, fresh air may be supplied by one or more intake louvres (126) proximate the air compressor (46) to ensure that the air compressor (46) is provided with cooler air during compression, optimizing efficiency of the air compressor (46); to minimize pulling cold air across the module (2) while the air compressor (46) is running; and to avoid formation of a vacuum in the module (2). In the various embodiments, the one or more intake louvres (126) may be positioned close to the floor proximate the air compressor (46) (FIG. 3B). In the various embodiments, the intake louvres (126) may be selected to be of a desired size to ensure that water or moisture is not pulled into the module (2) while the exhaust fans (98a, 98b) and the engine (24) are running.

Embodiments of the present invention are described in the following Examples, which are set forth to aid in the understanding of the invention, and should not be construed to limit in any way the scope of the invention as defined in the claims which follow thereafter.

Example 1

Specifications of an Exemplary System

The specifications of an exemplary engineered power on demand solar hybrid system capable of generating power at 6, 20, and 30 kW are set out in the following Tables 1-9.

TABLE 1

GENERAL

| | |
|---|---|
| Make | Westgen Technologies |
| Model | EPOD™ - 6 kW/20 kW/30 kW |
| Engine | Kubota™ DG972 (6 kW) |
| | Kubota™ WG2503 (20 kW) |
| | Kubota™ WG3800 (30 kW) |
| | Yanmar™ Y-EGG19A1 |
| | Yanmar™ Y-EGG23A1 |
| Engine Type | Reciprocating Engine |
| Engine Controller | Local PLC |

TABLE 2

ELECTRICAL SYSTEM

| | |
|---|---|
| System Power Output | 6,000 W/20,000 W/30,000 W |
| Power Distribution | 24 VDC & 120/240 VAC |
| Battery System | Sealed Gel Integrated Battery UPS |
| Battery Capacity | 980 AH @ 24 V (Option to Increase) |
| Battery Cycle Life | 2300 Cycles @ 50% Depth of Discharge |
| Battery Type | Sealed Tubular Gel SOPzV Block |
| Battery Bank Weight | 1,520 lbs |
| Power Back up | 30 A 120/240 V Backup Generator Receptacle |
| Panels | PLC/RTU/MCC |
| RTU | PLC with Embedded IO and SCADA System |
| Hybrid Inverter/Charger | Conext™ XW + NA |
| Inverter | A510™ Inverter(6,800 W)/(13,600 W)/(27,200 W) |
| DC Voltage Transducer | CR5300™ Series |
| Line Reactor | KDRD25L |

TABLE 3

SOLAR SYSTEM

| | |
|---|---|
| Power Generation | 3800 W Solar Generation (Option to Increase) |
| Solar Panel Brand | Canadian Solar™ |
| Linear power output Warranty | 25 Years |
| Solar Panel Type | 60-Cell Monocrystalline Module |
| Solar & Battery System Diagnostic Monitor | Conext™ ComBox |
| Solar Charge Controller | Conext™ MPPT 80 600 |
| Hybrid Inverter/Charger | Conext™ XW + NA |

TABLE 4

EPOD GENERATOR SPECIFICATIONS

| | |
|---|---|
| Make | Kubota™ |
| Model (Power Output) | Kubota™ DG972 (6 kW) |
| | Kubota™ WG2503 (20 kW) |
| | Kubota™ WG3800 (30 kW) |
| | Yanmar™ Y-EGG19A1 |
| | Yanmar™ Y-EGG23A1 |
| Engine Type | Reciprocating Engine |
| Lubrication | Long Run Oil System with Reservoir |
| Oil/Filter Change Interval | 2500 Hours |
| Oil Type | 10w30 Torq-Guard™ Engine Oil |
| Full System Oil Capacity | 80 Liters |
| Generator Weight with Stand | 550 lbs |

TABLE 5

COMMUNICATION

| | |
|---|---|
| Logic Controller | Controller M221 24 IO Transistor PNP Ethernet |
| Control Panel | Magelis™ HMI STU 655/855 (Option to Increase) |
| Sensor Switch | CM-PDT-10 Series Switch |

TABLE 6

FUEL OPERATIONAL SPECIFICATIONS

| | |
|---|---|
| Fuel Type | Natural Gas, Propane, (Wellhead Gas Capable) |
| Fuel Gas Conditioning | Inlet Fuel Gas Coalescing Filter and Regulator |

TABLE 6-continued

FUEL OPERATIONAL SPECIFICATIONS

| | |
|---|---|
| Fuel Pressure Range | 0.5-150 PSIG |
| Fuel Gas Consumption | 1.9 CFM Max (6 kW) |
| Fuel Propane Consumption | 0.6 CFM Max (6 kW) |
| BTU Requirements | 900-2500 BTU |

TABLE 7

STRUCTURAL

| | |
|---|---|
| Containment | Steel Shipping Container |
| Dimensions | 20' L × 8' W × 8.5' H |
| Access/Egress | Man Door with Window and Panic Hardware/ Sea Can Double Door Entrance |
| Walls/Insulation | Insulated Aluminum Foam Panels |
| Insulation Value | R12 |
| Flooring | Aluminum Diamond Plate Non-Slip Flooring |
| EPOD Weight | 11,600 lbs |
| Design Temperature | −45° C. to +35° C. |

TABLE 8

UTILITY

| | |
|---|---|
| Heating | 5 kW Forced Air Heater |
| Ventilation | Exhaust Fan & Ducting with Adjustable Dampers |
| Exhaust Fan | 120 VAC ¼ HP Fan |
| Smoke Detection | Smoke Detector with Alarm Contacts |
| Security | Interior Motion Detector with Call Outs |
| Lighting | Philips FluxStream ™ LED Lights |
| Convenience Receptacle | 120 VAC Supplied Inside |

TABLE 9

INSTRUMENT AIR SPECIFICATIONS

| | |
|---|---|
| Compressor | Duplex 5 HP (Option to Increase) |
| Compressor Make | Champion ™ (Other Options Available) |
| Compressor Type | Reciprocating (Other Options Available) |
| Wet Air Receiver | 120 Gallon |
| Wet Air Receiver Tank Drain | Electric Auto-Drain |
| Instrument Air Filtration | Pre & Post Air Filter |
| In-line Flow Meter | CDI 5100 |
| Desiccant Air Dryer | Trident Dryspell ™ PD238 (Other Options Available) |

Example 2

Specifications of an Exemplary Control Panel

The specifications of an exemplary control panel for the system described in Example 1 are set out below. The control panel is a micro-PLC based control system with a 10" color operator touchscreen designed and programmed to monitor and control instrument air compressors, dryer and outlet flow measurement to customer connections; natural gas/propane generator; building ambient temperature; building lighting and security system; and solar and battery system. The control panel features include:

CSA approved for use in general purpose NEMA 12 environment;
Pure sine wave 120/240 vac, 1 ph, 60 hz customer output power;
UPS 24 VDC customer output power;
Equipment and alarm status (dry NC or NO contact for customer connection);
Motion detection control for interior lighting and security;
Customer back-up generator 120/240 vac, 1 ph, 60 hz, 30 A exterior connection with 10 ft portable cable (L14-30 twist-lock outlet. Min. 5000 W customer generator);
Clearly identified covered and lockable (breaker lock) circuit breakers. No internal panel fuses. All accessible to the operator with no exposure to live electrical parts;
10" color touchscreen including an alarm banner with description, time & date (Logs up to 100 alarms); security password protected (default—security disabled); HAND/OFF/AUTO operation of compressors, exhaust fan and generator; adjustable equipment maintenance alarms; and data-logging.

Example 3

Exemplary Control Panel Touchscreen Instructions and Controls

Figure 4A:
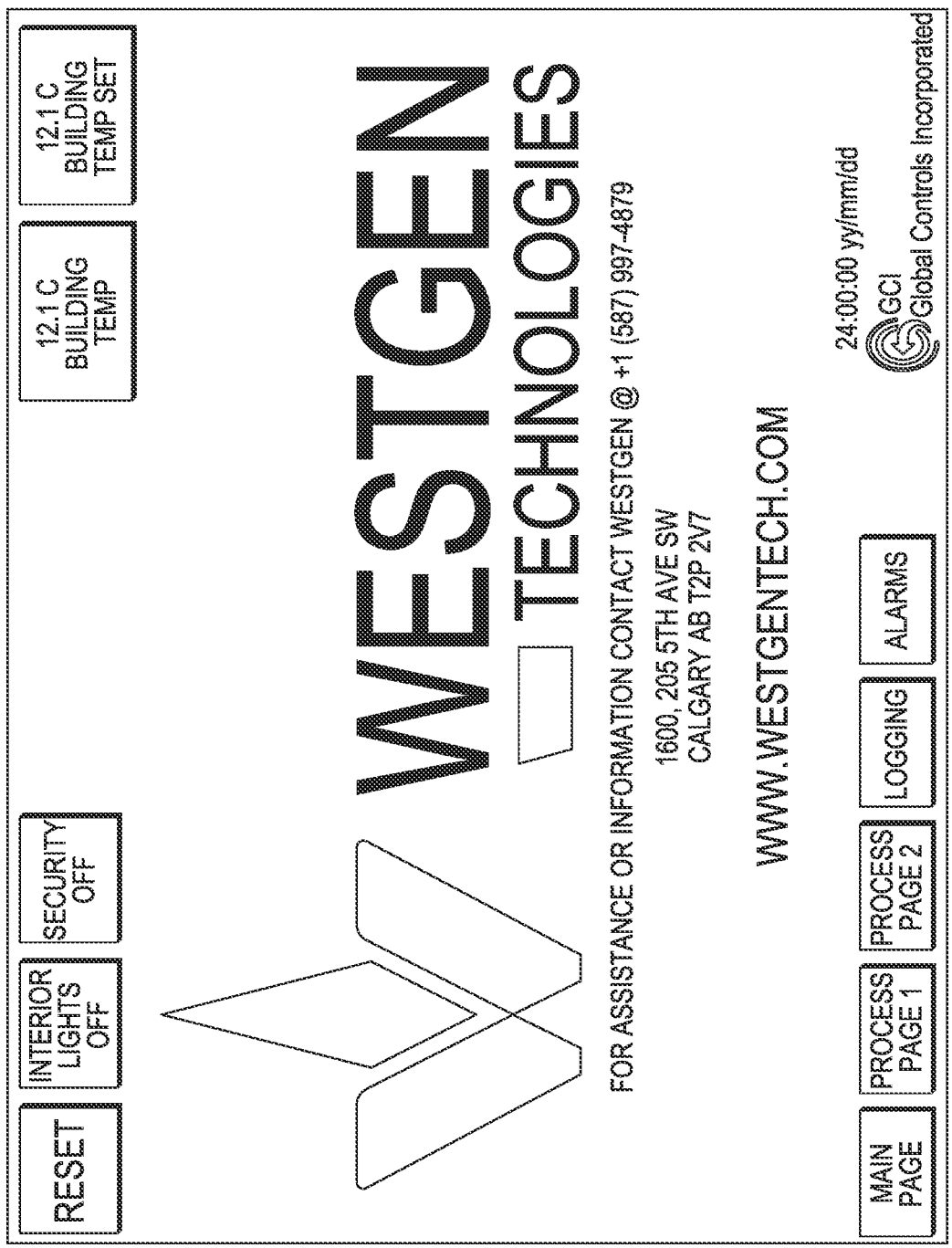

FIG. 4A shows a main panel screen having the following instructions and controls:

Pressing the "RESET" button resets all non-active alarms. (NOTE: Displayed on all pages).
"INTERIOR LIGHTS OFF/ON" display indicates status of EPOD interior lights. (NOTE: Displayed on all pages).
"SECURITY OFF/ON" displays EPOD motion sensor security system status. (NOTE: Displayed on all pages).
"BUILDING TEMP" displays current EPOD ambient temperature (NOTE: Displayed on all pages).
"BUILDING TEMP SET" displays current EPOD ambient temperature setpoint. A pop-up keypad will appear when pressed. Enter desired set-point & press enter. (NOTE: Displayed on all pages).
HMI pages are displayed at the bottom of the page. Pressing the page will take you to the page indicated. (NOTE: Displayed on all pages).
Displays current time, year, month and day. Pressing the current time, year, month and day display for 3 seconds takes you to the configuration page allowing you to make changes to the current time, year, month and day.

Figure 4B:
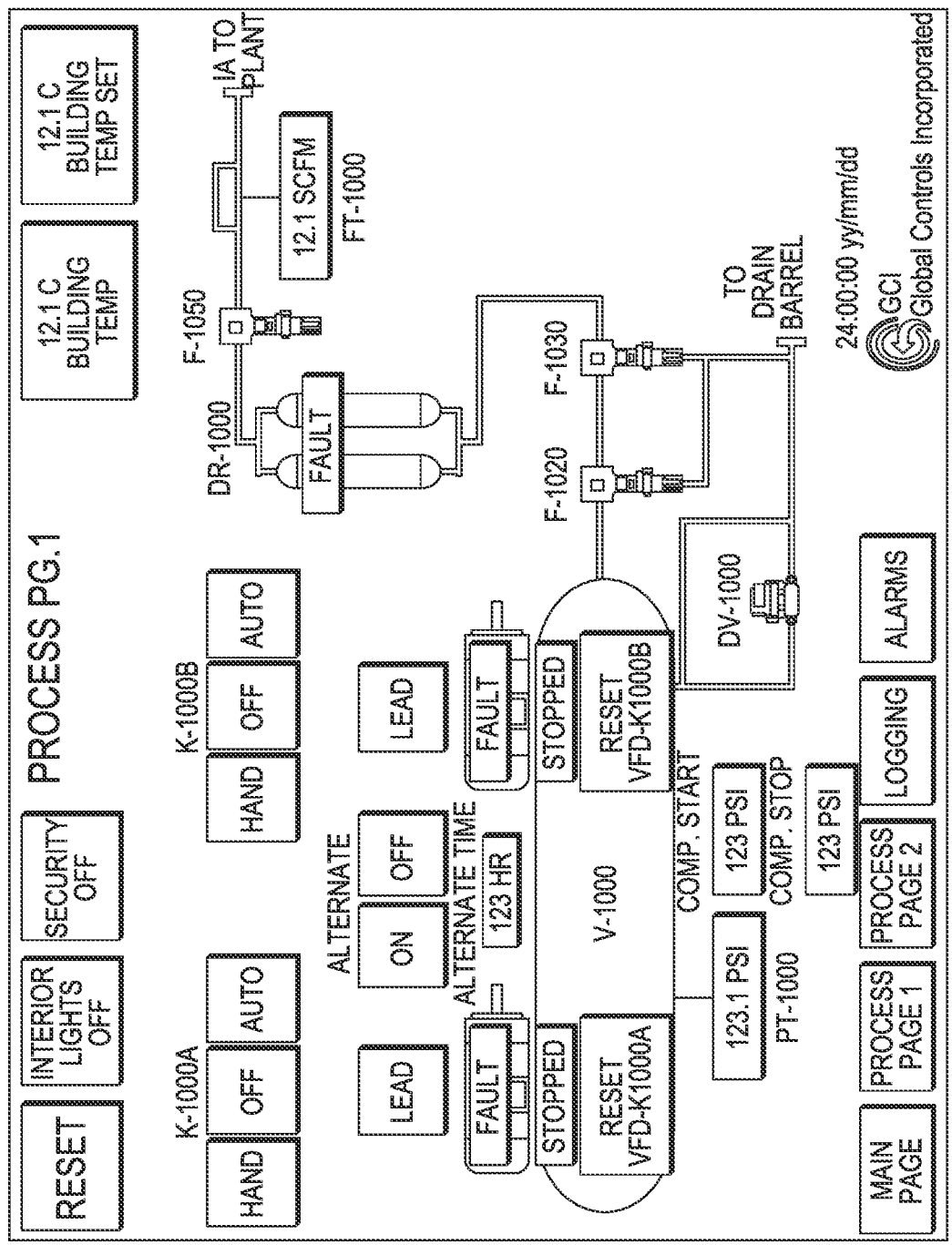

FIG. 4B shows a "Process PG. 1" panel screen having the following instructions and controls:

"HAND/OFF/AUTO" controls for both compressors. HAND or AUTO will turn green upon pressing to indicate they are enabled. Red indicates disabled. HAND will bypass PLC controls with exception of an ESD, smoke or fire alarm. OFF disables HAND & AUTO. AUTO enables PLC controls.
"HAND/OFF/AUTO" controls for the generator. HAND or AUTO will turn green upon pressing to indicate they are enabled. Red indicates disabled. HAND will bypass PLC controls with exception of an ESD, smoke or fire alarm. OFF disables HAND & AUTO. AUTO enables PLC controls.
"HAND/OFF/AUTO" controls for the generator exhaust recirculation louver. HAND or AUTO will turn green upon pressing to indicate they are enabled. Red indicates disabled. HAND will bypass PLC controls with exception of an ESD, smoke or fire alarm. OFF disables HAND & AUTO. AUTO enables PLC controls.
ACT-1000 closed position is displayed. "CLOSED MANUAL SET" displays the manual position setpoint. A pop-up keypad will appear when pressed. Enter desired set-point & press enter. "ACT-1000% closed displays the auto position of the actuator.

"RUNNING" green display for running equipment. "STOPPED" red display for stopped equipment.

Red blinking "FAULT" displays appear during an equipment fault. The fault display will be visible until the fault has been cleared and RESET button has been pressed. If a compressor VFD fault occurs, a green "RESET VFD-XXXXX button will appear. If the VFD fault is clear, pressing RESET VFDXXXXX button for 3 sec will reset the VFD. NOTE: After a VFD reset. If the faulted VFD initiated a fail to start alarm and the lag compressor is running. The lead VFD compressor will start again when the IA pressure drops below the START setpoint.

PT-1000 is displayed (PSI). "COMP. START" displays current PT-1000 start setpoint. A pop-up keypad will appear when pressed. Enter desired set-point & press enter. "COMP. STOP" displays current PT-1000 stop setpoint. A pop-up keypad will appear when pressed. Enter desired set-point & press enter.

"LEAD" control for both compressors. LEAD will turn green upon pressing to indicate it's enabled. The LEAD compressor will run as per the above COMP. START/STOP setpoints. NOTE: When compressors ALTERNATE is enabled, the LEAD buttons are disabled. If the lead compressor fails to start, the lag compressor will start when the IA pressure drops below the START setpoint.

"ALTERNATE TIME SET" displays current compressor A & B alternating duration. A pop-up keypad will appear when pressed. Enter desired set-point & press enter.

FT-1000 is displayed (SCFM).

Figure 4C:
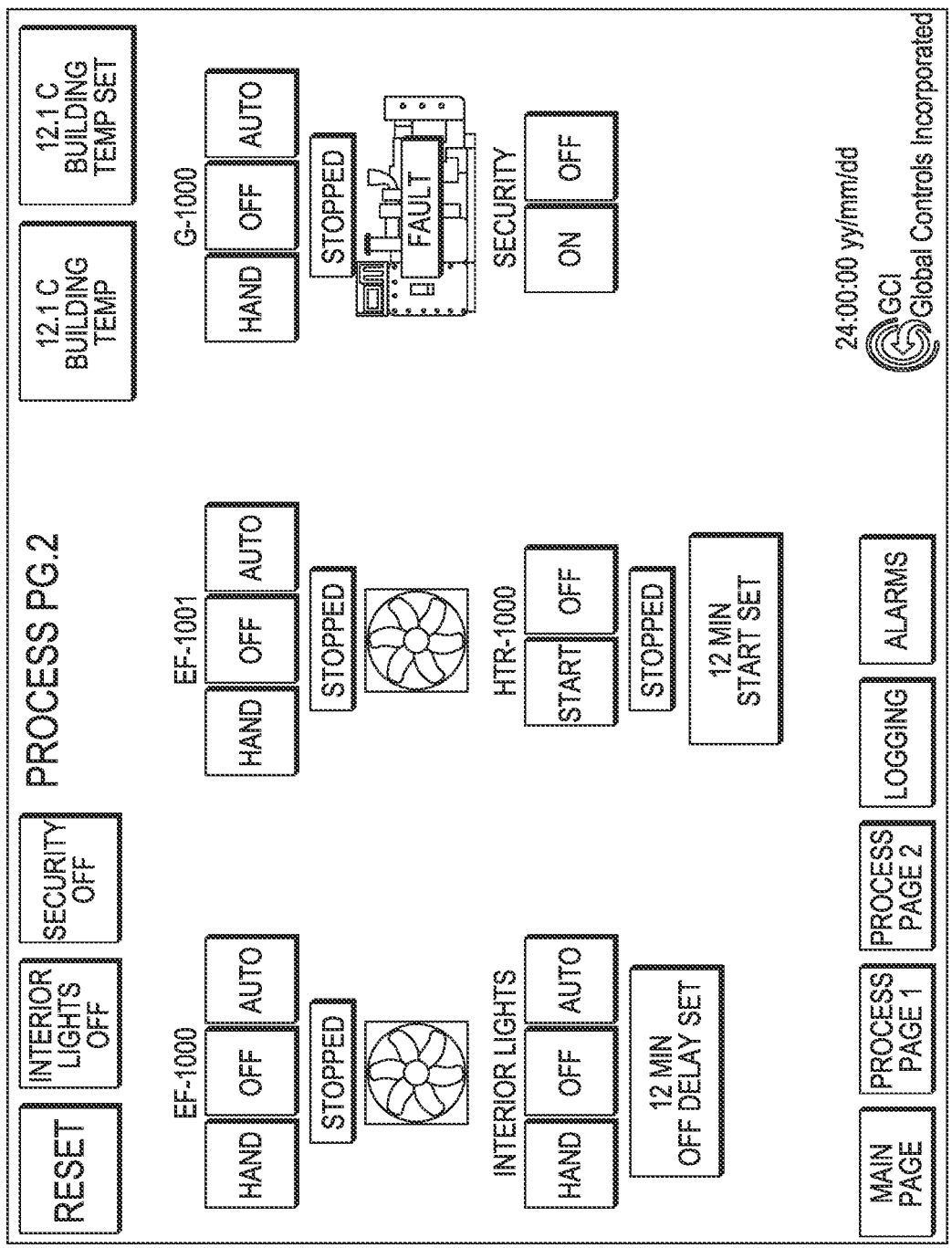

FIG. 4C shows a "Process PG. 2" panel screen having the following instructions and controls:

"HAND/OFF/AUTO" controls exhaust fans, generator & interior lights. HAND or AUTO will turn green upon pressing to indicate they are enabled. Red indicates disabled. HAND will bypass PLC controls with exception of an ESD, smoke or fire alarm. OFF disables HAND & AUTO. AUTO enables PLC controls.

"RUNNING" green display for running equipment. "STOPPED" red display for stopped equipment.

Red blinking "FAULT" displays appear during an equipment fault. The fault display will be visible until the fault has been cleared and RESET button has been pressed.

"OFF DELAY SET" displays current EPOD interior lights off (Time after a motion is detected) setpoint. A pop-up keypad will appear when pressed. Enter desired set-point & press enter.

"START SET" displays current EPOD catadyne heater start time (Required time to start catadyne heater) setpoint. A pop-up keypad will appear when pressed. Enter desired set-point & press enter. START will turn green upon pressing to indicate it's enabled. When the START SET time has elapsed, the START button will turn Red indicating its disabled. Pressing OFF at any time will disable the START enable.

Pressing Security "ON" or "OFF" will open the security screen. Enter the USER & PASSWORD (DEFAULT: USER=ADMIN PASSWORD=1234), press UNLOCK button & then the HOME button. You will be redirected to the home page. Navigate back to the PROCESS PG.2 page. To enable the security system press security ON button. It will turn green upon pressing to indicate it's enabled. A pop-up display will blink on all screens indicating the amount of time remaining to exit the EPOD. The non-adjustable time to exit is 60 sec.

If a motion is detected when the security system is enabled, the OFF button must be pressed (after security screen) within 60 sec or an alarm email or output is enabled.

FIG. 4D shows a "LOGGING" panel screen having the following instructions and controls:

FT-1000 "ON" will turn green upon pressing to indicate it's enabled. Red indicates disabled. "TOTAL HRS" displays the amount of time elapsed since enabled. "TOTAL SCF" displays the total SCF of FT-1000 since enabled. Both totals can be reset by pressing the "RESET LOGGING" for 3 seconds. "AVERAGE SCFM" displays the average SCFM (TOTAL SCF/TOTAL HRS/60).

Compressors and generator "TOTAL HRS" are displayed. Pressing the "RESET TOTAL HRS" opens a pop-up screen asking "ARE YOU SURE" you want to reset the totals. Hold the "RESET TOTAL HRS" for 5 seconds to reset the total. Press "CLOSE" to exit the pop-up screen.

Compressor and generator "TOTAL MAINTENANCE HRS" are displayed. Pressing the "RESET THE MAINTENANCE HRS" for 3 seconds will reset the totals.

"TOTAL MAINTENANCE HRS SET" displays the time setpoint for the (Required time to start Cata-Dyne™ heater) setpoint. A pop-up keypad will appear when pressed. Enter desired set-point & press enter.

Figure 4E:
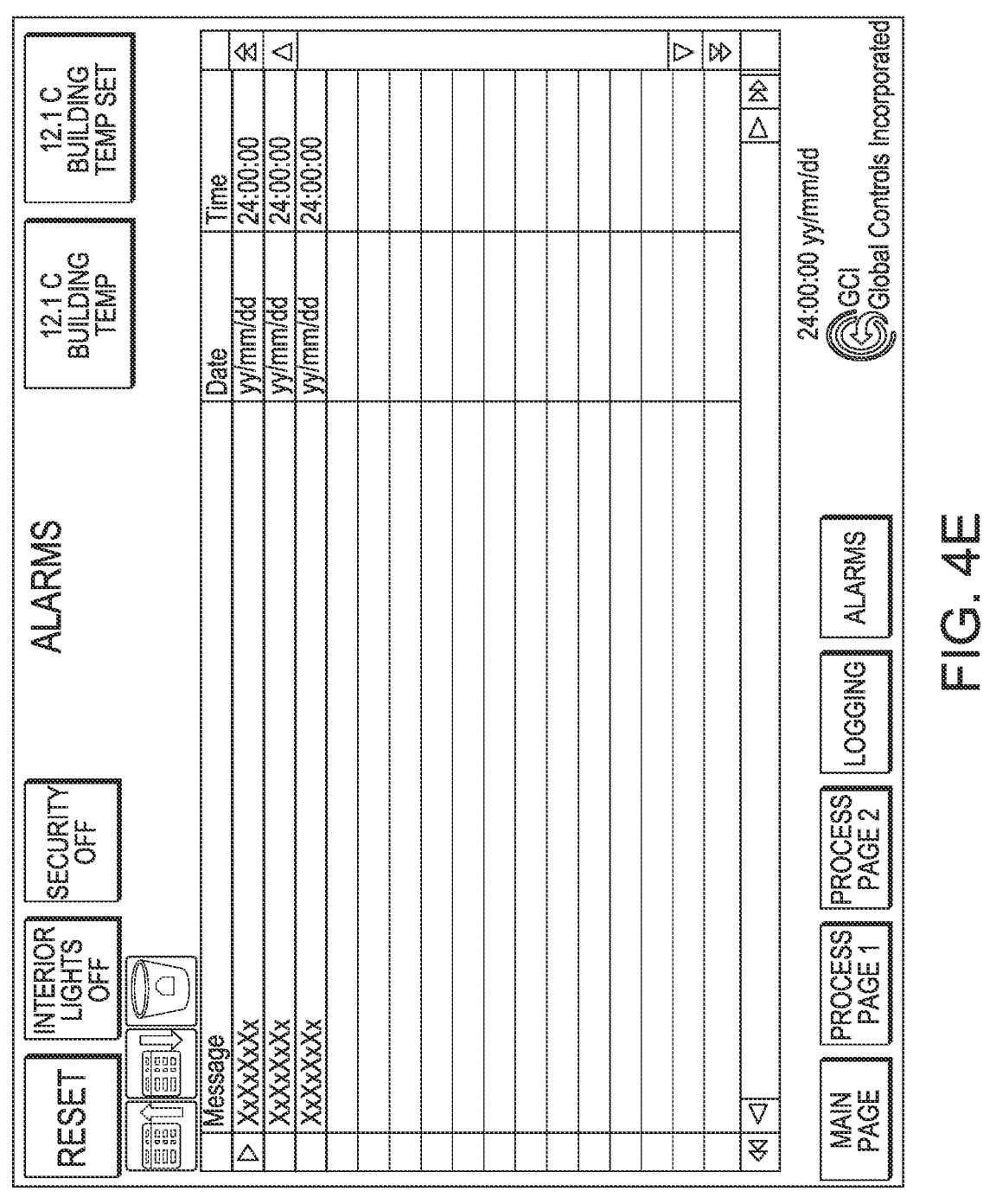

FIG. 4E shows an "ALARMS" panel screen having the following instructions and controls:

All EPOD alarms are displayed on the Alarm page including the message, date & time. All active alarms will be displayed with a red background. All non-active reset alarms will be displayed with a green background. Alarms are Reset by pressing the RESET button.

Pressing the UP/DOWN buttons scrolls through the alarms. Pressing the GARBAGE button will delete the alarm.

A maximum of 100 alarms can be displayed at once.

The following are the nEPOD alarms with descriptions:

DR-1000 FAULT ALARM (Active alarm when Dryer DR-1000 is de-energized or initiates a fault condition).

VFD-K1000A FAULT ALARM (Active alarm when VFD VFD-K1000A initiates a fault condition).

VFD-K1000B FAULT ALARM (Active alarm when VFD VFD-K1000B initiates a fault condition)

G-1000 FAULT ALARM (Active alarm when Generator G-1000 initiates a fault alarm).

MANUAL ESD ALARM (Active alarm when EPOD manual ESD button is pressed).

SD-1000 SMOKE DETECTOR ALARM (Active alarm when EPOD smoke detector initiates a smoke alarm).

FT-1000 LOSS OF SIGNAL ALARM (Active alarm when FT-1000 loses signal to EPOD PLC).

PT-1000 LOSS OF SIGNAL ALARM (Active alarm when PT-1000 loses signal to EPOD PLC).

TT-1000 LOSS OF SIGNAL ALARM (Active alarm when TT-1000 loses signal to EPOD PLC).

MD-1000 SECURITY MOTION ALARM (Active alarm 60 sec. (non-adjustable) after MD-1000 detects a motion when the security system is enabled.

K-1000A FAIL TO START ALARM (Active alarm when IA motor K-1000A fails to start in LEAD after 5 sec. (non-adjustable).

K-1000B FAIL TO START ALARM (Active alarm when IA motor K-1000B fails to start in LEAD after 5 sec. (non-adjustable).

G-1000 FAIL TO START ALARM (Active alarm when Generator G-1000 fails to start in LEAD after 5 sec. (non-adjustable).

K-1000A MAINTENANCE ALARM (Active alarm when the K-1000A TOTAL MAINTENANCE HRS is equal to the TOTAL MAINTENANCE HRS SETPOINT).

K-1000B MAINTENANCE ALARM (Active alarm when the K-1000B TOTAL MAINTENANCE HRS is equal to the TOTAL MAINTENANCE HRS SETPOINT).

G-1000 MAINTENANCE ALARM (Active alarm when the K-1000B TOTAL MAINTENANCE HRS is equal to the TOTAL MAINTENANCE HRS SETPOINT).

AT-1000 FIRE DETECTOR ALARM (Active alarm when EPOD fire detector initiates a fire alarm).

AT-1000 LOSS OF SIGNAL ALARM (Active alarm when AT-1000 loses signal to EPOD PLC).

Example 4

Exemplary Mode of Operating the Generator

An exemplary mode of operating the generator in automatic mode or manual mode may involve the following steps:

TABLE 10

| STEPS FOR AUTOMATIC MODE |
| --- |
| Starting: |
| 1. Check Engine Coolant and Oil Levels. |
| 2. Check unit over for signs of damage or missing parts. |
| 3. Check block heater operation. |
| 4. Check battery connection. |
| 5. Check battery charger Operation. |
| 6. Open fuel valve. |
| 7. Turn Key switch on Control panel to on, wait for screen to load. |
| 8. Ensure the main breaker is open. |
| 9. Press the Green Start Button. |
| 10. Unit will crank and come up to speed. |
| 11. Check unit Voltage, frequency to make sure they are correct. |
| 12. Press the Red Stop Button, allow unit to come to complete stop. |
| 13. Press the White Auto Button. |
| 14. Auto Mode Icon will display on screen. |
| 15. Close main breaker. |
| When the start contacts close: |
| a. Start Delay Timer begins. |
| b. Once start delay timer ends, crank relay is engaged. |
| c. Unit will now run at rated speed until Start Contacts open. |
| d. Start Contacts open. |
| e. Cool down timer begins. |
| f. Once cool down timer ends, unit is stopped. |
| g. Unit stays in ready mode for next start command. |
| Removing unit from Auto Mode: |
| 1. Press the Red Stop button. |
| 2. Open the main breaker. |
| 3. Turn key switch to off, ensure power has been removed from panel. |
| 4. Close fuel valve. |

TABLE 10-continued

| STEPS FOR AUTOMATIC MODE |
| --- |
| Note: |
| When unit is in Auto Mode ensure that: |
| 1. Fuel valve remains open. |
| 2. Main breaker remains closed. |
| 3. Battery charger is on. |
| 4. Block heater is on. |

TABLE 11

| STEPS FOR MANUAL MODE |
| --- |
| Starting: |
| 1. Check Engine Coolant and Oil Levels |
| 2. Check unit over for signs of damage or missing parts |
| 3. Check block heater operation |
| 4. Check battery connection |
| 5. Check battery charger Operation |
| 6. Open fuel valve |
| 7. Turn Key switch on Control panel to on, wait for screen to load |
| 8. Ensure the main breaker is open |
| 9. Press the Green Start Button |
| 10. Unit will crank and come up to speed |
| 11. Check unit Voltage, frequency to make sure they are correct |
| 12. Close main breaker |
| Stopping: |
| 1. Press the Red Stop button |
| 2. Open the main breaker |
| 3. Turn key switch to off, ensure power has been removed from panel |
| 4. Close Fuel valve |

Example 5

Exemplary Mode of Operation of a Duplex 5 HP Air Compressor

An exemplary mode of operating a duplex 5 HP air compressor may involve the following steps:

TABLE 12

| Steps for Operating Duplex 5 HP Air Compressor |
| --- |
| 1. Inspect unit for any visible signs of damage that would have occurred in shipment or during installation. |
| 2. Pull main disconnect switch to unit to assure that no power is coming into the unit. "Lock Out" or "Tag Out" switch. Connect power leads to start. |
| 3. Check compressor oil level. Add oil as required |
| 4. Activate main disconnect switch. |
| 5. "Jog" motor and check for proper rotation by direction arrow. If rotation is wrong, reverse input connections on the magnetic starter. |
| 6. Close receiver outlet hand valve and start. |
| 7. With receiver hand valve closed, let machine pump up to operating pressure. At this stage the automatic controls will take over. Check for proper cycling operation. |
| 8. Check for proper operation of any options. |
| 9. When the initial run period has shown no operating problems, shut unit down and recheck oil level. |
| 10. Open receiver hand valve. The air compressor unit is now ready for use. |

Example 6

Exemplary Mode of Operation

An exemplary mode of operation for the unit is to minimize engine run time. Ideally average annual run time should be around 30-40%, with the remainder of site load (including air compressor load) handled by solar and/or wind. Since maintenance cycles on the air compressor and generator are similar at approximately 2500 hours between oil changes, the air compressor should be sized for approximately 30% duty cycle per compressor (60% duty cycle if using a duplex compressor system). Note that further reduced instrument air run time can sometimes be beneficial if it reduces total engine runtime.

Additional Disclosures

The following are non-limiting, specific embodiments of the system, module, and methods of generating power on demand and off-grid:

Embodiment A. A system for generating power on demand and off-grid comprising: a power source using a renewable resource; an uninterruptible power supply (UPS) comprising a storage battery and coupled to the power source for receiving DC or AC power; and an intelligent controller coupled to the UPS for controlling output of the DC or AC power to one or more devices.

Embodiment B. The system of Embodiment A, wherein the power source for delivering the DC power is a photovoltaic array.

Embodiment C. The system of Embodiment A or B, further comprising a battery charge controller coupled to the power source for regulating the DC power.

Embodiment D. The system of any one of Embodiments A through C, wherein the power source for delivering the AC power is selected from a generator or a utility power connection.

Embodiment E. The system of any one of Embodiments A through D, wherein the power source comprises a generator having a size ranging from about 5 kW to about 30 kW, and comprising an engine powered by hydrocarbon gas.

Embodiment F. The system of Embodiment E, wherein the hydrocarbon gas is filtered through a coalescing filter to remove free liquid.

Embodiment G. The system of Embodiment E or F, wherein the engine comprises an extended lubrication system for slipstreaming a portion of oil through a filter to extend service intervals, and diluting combustion byproducts.

Embodiment H. The system of any one of Embodiments A through G, wherein the storage battery is coupled to the generator by a bi-directional power inverter, the bi-directional power inverter being configured, in a first mode of operation, to receive and convert the DC power into AC power, and in a second mode of operation, to receive and convert AC power into DC power for charging the storage battery.

Embodiment I. The system of Embodiment H, wherein the bi-directional power inverter qualifies the DC or AC power and switches loads within a set timeframe to ensure uninterrupted transition from the storage battery to the generator.

Embodiment J. The system of Embodiment H, wherein the bi-directional power inverter comprises an AC transfer switch for providing the AC power from one or more AC power sources.

Embodiment K. The system of any one of Embodiments A through J, further comprising one or more of a DC power distribution unit and an AC power distribution unit for supplying power to one or more devices.

Embodiment L. The system of any one of Embodiments A through K, wherein the one or more devices comprises at least one air compressor capable of providing compressed air to one or more pneumatic devices.

Embodiment M. A system for generating power on demand and off-grid comprising: a photovoltaic array for delivering DC power; a generator having a size ranging from about 5 kW to about 30 kW, and comprising an engine powered by hydrocarbon gas filtered through a coalescing filter and comprising an extended lubrication system for slipstreaming a portion of oil through a filter to extend service intervals, and diluting combustion byproducts; an uninterruptible power supply (UPS) comprising a storage battery, the UPS being coupled to the photovoltaic array for receiving the DC power, and to the generator by a bi-directional inverter for receiving DC or AC power; and an intelligent controller coupled to the UPS for controlling output of the DC or AC power to at least one air compressor capable of providing compressed air to one or more pneumatic devices.

Embodiment N. A system for generating power on demand and off-grid comprising: a photovoltaic array for delivering DC power; a generator having a size ranging from about 5 kW to about 30 kW, and comprising an engine powered by hydrocarbon gas filtered through a coalescing filter and comprising an extended lubrication system for slipstreaming a portion of oil through a filter to extend service intervals, and diluting combustion byproducts; an uninterruptible power supply (UPS) comprising a storage battery, the UPS being coupled to the photovoltaic array for receiving the DC power, and to the generator by a bi-directional inverter for receiving DC or AC power; and an intelligent controller coupled to the UPS for controlling output of the DC or AC power to one or more devices.

Embodiment O. A system for generating power on demand and off-grid comprising: a generator having a size ranging from about 5 kW to about 30 kW, and comprising an engine powered by hydrocarbon gas filtered through a coalescing filter and comprising an extended lubrication system for slipstreaming a portion of oil through a filter to extend service intervals, and diluting combustion byproducts; a power storage device coupled to the generator by a bi-directional power inverter for receiving DC or AC power; and an intelligent controller coupled to the storage battery for controlling output of the DC or AC power to one or more devices.

Embodiment P. A system for generating power on demand and off-grid comprising: an on-site power source for powering an air compressor capable of providing compressed air to one or more pneumatic devices; and an intelligent controller for collecting data in relation to carbon credit generation.

Embodiment Q. A module formed of a modified shipping container and comprising the system of any one of Embodiments A-P.

Embodiment R. The module of Embodiment Q, further comprising one or more of a motion sensor, lighting system, smoke detector, space heater using renewable energy, and heating, ventilation, and air conditioning system.

Embodiment S. A method for generating power on demand and off-grid using the system or module of any one of embodiments A through R, the method comprising: converting sunlight rays into DC power using a photovoltaic array; supplying hydrocarbon gas recovered from a wellhead to operate an engine of a generator to generate AC power; conditioning the DC or AC power using a bi-directional inverter to output conditioned DC or AC power; delivering the conditioned DC or AC power to a UPS comprising a storage battery; and controlling output of the DC or AC power to operate at least one air compressor for providing compressed air to one or more pneumatic devices.

Embodiment T. The method of Embodiment S, wherein the hydrocarbon gas is filtered through a coalescing filter.

Embodiment U. The method of Embodiment S or T, wherein the engine comprises an extended lubrication system for slipstreaming a portion of oil through a filter to extend service intervals, and diluting combustion byproducts.

Embodiment V. The method of any one of Embodiments S through U, wherein conditioning the DC or AC power comprises converting the DC power to AC power, or the AC power to DC power.

Embodiment W. A method for generating power on demand and off-grid using the system or module of any one of embodiments A through R, the method comprising: converting sunlight rays into DC power using a photovoltaic array; supplying hydrocarbon gas to operate an engine of a generator to generate AC power; conditioning the DC or AC power using a bi-directional inverter to output conditioned DC or AC power; delivering the conditioned DC or AC power to a UPS comprising a storage battery; and controlling output of the DC or AC power to operate one or more devices.

Embodiment X. A method for generating power on demand and off-grid using the system or module of any one of embodiments A through R, the method comprising: supplying hydrocarbon gas to operate an engine of a generator to generate AC power; conditioning the DC or AC power using a bi-directional inverter to output conditioned DC or AC power; delivering the conditioned DC or AC power to a power storage device; and controlling output of the DC or AC power to operate one or more devices.

Embodiment Y. A method for generating power on demand and off-grid using the system or module of any one of embodiments A through R, the method comprising: supplying power from an on-site power source to an air compressor capable of providing compressed air to one or more pneumatic devices; and collecting data in relation to carbon credit generation.

Additional embodiments which result from combining, integrating and/or omitting features of the embodiments explicitly described herein are not intended to be precluded. Although various embodiments have been shown and described, the invention is not limited to such embodiments and will be understood to include all modifications and variations as would be apparent to one skilled in the art. It should be understood that the invention is not intended to be limited to the particular forms disclosed. Rather, the intention is to cover all modifications, equivalents and alternatives falling within the scope of the invention as defined by the appended claims.

The embodiments of the invention in which an exclusive property or privilege is claimed are defined as follows:

1. An integrated and self-contained power generating system for stationary off-grid use on a wellsite producing natural gas, to power an electrical wellsite load, the system comprising:
   (a) a generator generating an output and powered by an engine configured to use the natural gas as a fuel and configured to maintain a predetermined engine speed by decreasing or increasing fuel flow in response to the electrical wellsite load and quality of the fuel;
   (b) a rechargeable storage battery;
   (c) at least one inverter connected between the generator output, the rechargeable storage battery and the electrical wellsite load, wherein the inverter is configured to convert DC power to AC power and AC power to DC power;
   (d) a controller coupled to the inverter, the rechargeable storage battery and the generator, wherein the controller selects and implements either:
   (i.) battery mode wherein the generator is off, and the electrical wellsite load is connected to the rechargeable storage battery; or
   (ii.) a generator mode wherein the generator is on thereby powering the electrical wellsite load via the at least one inverter and charging the rechargeable storage battery, wherein the battery mode is selected when the battery charge is above a predetermined level, and the generator mode is selected when the battery charge is below a predetermined level; and
   (e) wherein the electrical wellsite load requires between 3 to 20 horsepower.

2. The system of claim 1, wherein the electrical wellsite load is an AC load.

3. The system of claim 2, wherein the AC load comprises an air compressor.

4. The system of claim 1, wherein the controller selects and implements battery mode upon detecting a surge or drop in generator voltage and frequency output.

5. The system of claim 1, wherein the controller switches to generator mode only when a voltage and frequency of the generator matches the electrical wellsite load.

6. The system of claim 1, wherein the generator mode comprises a transition mode prior to switching to battery mode, wherein the generator cools down under a partial state of load while topping off the battery charge.

7. A self-contained and automated instrument air system comprising a closed container, having external connections for a natural gas inlet and a compressed air outlet, wherein the system comprises:
   (a) a generator powered by an engine configured to use the natural gas as a fuel;
   (b) a rechargeable storage battery;
   (c) at least one inverter connected between the generator output, the rechargeable storage battery and an electrical load, wherein the inverter is configured to convert DC power to AC power and AC power to DC power;
   (d) the electrical load comprises an air compressor connected to the at least one inverter to operate off either DC or AC power;
   (e) a controller coupled to the at least one inverter, the rechargeable storage battery and the generator, wherein the controller selects and implements either:
   (i.) a battery mode wherein the generator is off, and the electrical load is connected to the rechargeable storage battery; or
   (ii.) a generator mode wherein the generator is on thereby powering the electrical load via the at least one inverter and charging the rechargeable storage battery, wherein the battery mode is selected when the battery charge is above a predetermined level, and the generator mode is selected when the battery charge is below a predetermined level.

8. The system of claim 7, wherein the closed container comprises a shipping container.

9. A method of powering an air injection compressor on a wellsite producing natural gas, the method comprising:
   (a) operating a generator to generate electrical output, the generator powered by an engine configured to use the natural gas as a fuel, and maintaining a predetermined engine speed by decreasing fuel flow in response to higher fuel caloric value and increasing fuel flow in response to lower fuel caloric value;

(b) storing power in a rechargeable storage battery;
(c) converting the generator output to DC power to either recharge the rechargeable storage battery, or power the air compressor via at least one inverter when the air compressor operates on DC power, or both;
(d) converting the rechargeable storage battery output to AC power to power the air compressor when the air compressor operates on AC power, and
(e) wherein the engine only runs the generator when the battery charge is below a set level.

10. The method of claim 9, wherein the generator output is less than about 30 kW.

* * * * *